United States Patent [19]

Parekh et al.

[11] 3,850,735

[45] Nov. 26, 1974

[54] PROCESS FOR DEPOSITING A FILM

[75] Inventors: Girish Girdhar Parekh, Stamford; Werner Josef Blank, Wilton, both of Conn.

[73] Assignee: American Cyanamid Company, Stamford, Conn.

[22] Filed: Oct. 2, 1972

[21] Appl. No.: 294,042

Related U.S. Application Data

[62] Division of Ser. No. 130,448, April 1, 1971, Pat. No. 3,719,627.

[52] U.S. Cl. ............................. 204/181, 117/132 B
[51] Int. Cl........ B01k 5/02, C23b 13/00, B44d 1/36
[58] Field of Search .................. 204/181; 117/132 B

[56] References Cited
UNITED STATES PATENTS 3,661,819   5/1972   Koval et al........................ 204/181
3,681,224   8/1972   Stromberg .......................... 204/181

*Primary Examiner*—Howard S. Williams
*Attorney, Agent, or Firm*—Evans Kahn

[57] ABSTRACT

A composition comprising (1) from about 40% to about 95%, by weight, of an anionic acrylic polymer containing at least a carboxyl or alcoholic hydroxyl function, (2) from about 4.9% to about 50%, by weight, of an amine-aldehyde cross-linking agent and (3) from about 0.1% to about 10%, by weight, of a cyclic trisulfone is provided. The composition finds utility in coating applications wherein low temperature cure of the said coated resinous composition can be attained with attendant high resistance to organic solvents.

9 Claims, No Drawings

3,850,735

PROCESS FOR DEPOSITING A FILM

This application is a divisional of our copending application, Ser. No. 130,448, filed on Apr. 1, 1971 now U.S. Pat. No. 3,719,627.

BACKGROUND AND DESCRIPTION OF PRIOR ART

Water dispersed polymeric coating compositions have been employed to coat metallic surfaces by hand or automatic spray painting, electrostatic painting, brushing, dipping and, more recently, by electrodeposition. The latter method has been gaining in acceptance because electrodeposition can be used to coat shaped metallic surface uniformly. However, none of the methods is wholly satisfactory. Although good uniformity, film strength, hardness and adhesion are noted in U.S. Pat. No. 3,403,088 to Donald P. Hart, issued on Sept. 24, 1968 and U.S. Pat. No. 3,471,388 to J. N. Koral, issued on Oct. 7, 1969, a difficult problem is presented where low temperature curing of electro-coated metallic objects is required, due to the heat sensitivity of the metallic object. As is known, distortion of the crystalline structure of aluminum, a metal widely used in the aircraft industry, takes place at temperatures in excess of about 275°F. Such temperatures, and even higher, are normally required to effect curing of the electrodeposited polymeric coat composition so as to cause that composition to harden. Nonetheless, such elevated temperatures cannot be universally employed, because the coated surface of certain metals, or metals to which rubber or plastic fittings are attached, requires the use of temperatures sufficiently high to effect the cure, while simultaneously, adversely affecting the metal substrate or attachments thereto. For instance, in the patent to Hart, above-identified, curing of a partially neutralized acrylic interpolymer containing at least carboxyl and hydroxyl groups and an amine-aldehyde condensation product, when applied to a metallic surface, as for instance, occurs at elevated temperatures of at least 350°F. Where such temperatures are used and, even higher, as for instance, 500°F., distortion of the microcrystalline structure of an aluminum substrate occurs. Further, cured coated articles are frequently affected by organic solvents, as, for example, acetone or methyl ethyl ketone. Still further, many baths containing coating compositions are not wholly satisfactory, because they are found to be relatively unstable and require replacing or replenishing at frequent intervals which is both time and treasure consuming.

SUMMARY

A three component composition of matter which can be used effectively in the coating of metallic articles by conventional techniques and particularly by electrophoretic techniques followed by heat curing at low temperatures hitherto unavailable, has been discovered. Non-distorted, uniformly coated metallic articles with attendant resistance to detergents, salt spray and most organic solvents have been prepared.

DESCRIPTION OF THE INVENTION INCLUDING PREFERRED EMBODIMENTS

As one component of a three component system, there is provided an acrylic, anionic water dispersible, non-gelled polymer containing carboxyl and alcoholic hydroxyl functions. In addition, the anionic polymer may also contain an amide reactive site. The polymer is a result of vinyl polymerization, epoxy polymerization, polyester compositions, or a maleinised oil. The polymeric material may be completely water soluble or they may be substantially water insoluble but which are capable of being dispersed in water. Sometimes, it may be necessary to use appropriate surfactants to disperse these polymeric materials. The term "water dispersible," therefore, is intended to encompass both the aqueous solutions as well as dispersions in which the polymeric material is suspended in the aqueous medium. These anionic polymeric materials may contain carboxyl groups and alcoholic hydroxyl groups as well as amide groups.

All of these anionic, water dispersible, non-gelled polymeric materials having carboxyl groups and/or alcoholic hydroxyl groups and/or amide groups have water sensitive sites obviously, by virtue of the presence of these groups, and these water sensitive sites should be tied up by interreaction with the second component of the system, an aminoaldehyde compound in a cross-linking mechanism.

The anionic polymeric materials prepared by vinyl-polymerization may be prepared in either an aqueous solution, an organic solvent, or in an aqueous emulsion system, all of which procedures are thoroughly well known in the art, and it is not believed to be necessary to elaborate on such procedures here.

The acrylic polymers will be prepared by polymerizing polymerizable monomers such as acrylic acid, methacrylic acid, crotonic acid, cinnamic acid, $\beta$-benzoyl acrylic acid, and polycarboxylic acids of the $\alpha,\beta$-ethylenically unsaturated class such as maleic, fumaric, itaconic, mesaconic, ataconic, and the halogenated acids such as halogenated maleic or, more specifically, chloromaleic acid, and the like. These acidic materials may be copolymerized or polymerized with other monomers which contain no carboxyl groups, such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate, and the like. Still further, one could use such polymerizable compounds as styrene, ortho-, meta- or paraalkyl styrenes such as the o-, m- or p-methyl, ethyl, propyl and butyl styrenes, 2,4-dimethyl styrene, 2,3-dimethyl styrene, 2,5-dimethyl styrene, vinyl naphthenate, acrylonitrile, methacrylonitrile, halo-ring or side-chain styrenes such as $\alpha$-chloro styrene, ortho-, meta-, para-chlorostyrenes, 2,4-dichloro styrene, 2,3-dichlorostyrene, 2,5-dichlorostyrene or the alkyl side-chain styrenes such as $\alpha$-methyl styrene, $\alpha$-ethyl styrene, and the like. Additionally, one can make use of such polymerizable vinyl monomers as acrylamide, methacrylamide, ethacrylamide, N-tertiary-butylacrylamide, and the like.

The anionic polymeric materials containing alcoholic hydroxyl groups are prepared by using a polymerizable vinyl monomer which contains an alcoholic hydroxyl and is to be found in such compounds as the hydroxyalkyl esters of $\alpha,\beta$-unsaturated monocarboxylic acids such as the hydroxyalkyl esters of acrylic acid, methacrylic, ethacrylic and chloro as well as the other chloro substituted acrylic acids. These esters may either have a primary or a secondary hydroxyl group. Illustrative of the types of compounds that are used to make the copolymers in the anionic, polymeric material are 2-hydroxyethyl acrylate, 2-hydroxypropyl acrylate, 3-hydroxypropyl acrylate, 2-hydroxybutyl acrylate, 3-hydroxybutyl acrylate, 4-hydroxybutyl acrylate, 8-hydroxyoctyl acrylate, 2-hydroxyethyl methacrylate, 5-hydroxyhexylmethacrylate, 6-hydroxyoctylmethacrylate, 8-hydroxyoctylmethacrylate, 10-hydroxydecylmethacrylate, 3-hydroxypropyl crotonate, 4-hydroxyamyl crotonate, 5-hydroxyamyl crotonate, 6-hydroxyhexyl crotonate, 7-hydroxyheptyl crotonate, 10-hydroxydecyl crotonate, and the like. These hydroxy esters are used in combination with one another with other polymerizable vinyl monomers devoid of any alcoholic hydroxyl group including those set forth hereinabove in the discussion of the carboxyl group-containing monomers. Additionally, one can make use of similar acetal-containing polymerizable vinyl monomers, such as methoxymethylacrylamide, methoxymethylmethacrylamide, and the like.

Among the amide group-containing monomers which may be used in the preparation of the anionic, water dispersible, polymeric material used in the present invention are: acrylamide, methacrylamide, ethacrylamide, and the like. These polymerizable acrylamides may be used to prepare anionic polymeric materials used in the present invention with any of the carboxyl group-containing monomers or the hydroxyl group-containing monomers or with any of the polymerizable monomers set forth hereinabove.

To obtain a satisfactory balance of properties, that is, good electrocoating bath stability, low cure temperature (i.e., from 210°F. to 260°F.), good corrosion and humidity resistance of the coating as well as smoothness and blister-free appearance, it is advantageous to utilize anionic polymers containing of from about 1.0% to about 25%, and preferably from 4% to 15% of the carboxyl function and from 0.5% to 10%, and preferably from 1.5% to 4% of the hydroxyl function, all percentages based on the weight of the overall finished polymer.

In general, the finished polymer will exhibit the following properties: Acid No. 55 to 95; Hydroxyl No. 44 to 95; Viscosity: $Z_2$ to $Z_6$ (when solids equal 50% to 80%); and a Gardner color from 1 to 12.

The second component of the mixture containing the hereinabove defined polymer is an amino aldehyde cross-linking agent. For coating applications other than electrocoating, there may be used any amino cross-linking agent, whether fully etherified, partially etherified, or unetherified. However, for electrocoating applications, the use of fully etherified amino aldehyde cross-linkers is required. Usually, the latter amino aldehyde cross-linkers are present in amounts ranging from about 4.9% to about 50% and the balance being principally the polymer containing at least carboxyl and/or hydroxyl functions. Advantageously, any fully etherified amino cross-linking agent can be incorporated herein as for instance, hexakismethoxymethylmelamine which is prepared according to the process shown in U.S. Pat. No. 2,998,411 which patent is incorporated herein by reference. Modification of the hexakismethoxymethylmelamine are shown in U.S. Pat. No. 3,471,388 wherein a mixture of substantially water insoluble, substantially fully etherified hexamethylolmelamines which have no more than four methoxy methyl groups on the average and at least two alkoxy methyl groups selected from the group consisting of ethoxy methyl, propoxy methyl and butoxy methyl. These mixed fully etherified hexamethylolmelamine compounds are disclosed in said patent and incorporated herein by reference. Additionally, the fully etherified tetramethylolbenzoguanamine compounds may be used, such as those disclosed in U.S. Pat. No. 3,091,612 and the earlier U.S. Pat. Nos. 2,197,357 and 2,454,495, all of which patents are incorporated herein by reference.

The third component of the mixture containing any of the hereinabove defined polymers and cross-linking agents are cyclic trisulfones having the structure:

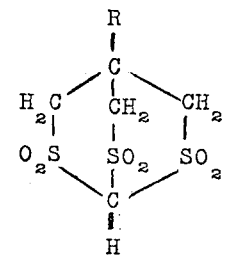

where R is hydrogen or alkyl of from 1 to 4 carbons. Methods for preparing the above-noted cyclic trisulfones are all well known as evidenced by a Doering et al publication in the Journal American Chemical Society, Vol. 77, pages 509–513, (1955) which is incorporated herein by reference. The cyclic trisulfones are usually incorporated in amounts ranging from about 0.1% to about 10%, based on the overall polymer and cross-linking agent mixture.

Illustrative cyclic trisulfones which are particularly effective in permitting low temperature curing are:

2,6,7-trithiabicyclo[2.2.2]octane-2,2,6,6,7,7-hexaoxide, 4-methyl-2,6,7-trithiabicyclo[2.2.2]octane-2,2,6,6,-7,7-hexaoxide, 4-ethyl-2,6,7-trithiabicyclo[2.2.2]octane-2,2,6,6,-7,7-hexaoxide, 4-n-propyl-2,6,7-trithiabicyclo[2.2.2]octane-2,2,6,6,-7,7-hexaoxide, 4-isopropyl-2,6,7-trithiabicyclo[2.2.2]octane-2,2,6,6,-7,7-hexaoxide, 4-n-butyl-2,6,7-trithiabicyclo[2.2.2 octane-2,2,6,6,-7,7-hexaoxide, 4-isobutyl-2,6,7-trithiabicyclo[2.2.2]octane-2,2,6,6,-7,7-hexaoxide, and 4t-butyl-2,6,7-trithiabicyclo[2.2.2]octane-2,2,6,6,-7,7-hexaoxide.

The cyclic trisulfones are also found to be particularly useful, since they are compatible with and stable in the polymer environment of the present invention.

The anionic polymer, the fully etherified amino cross-linking agent and the acyclic trisulfone are admixed with agitation. Usually, a neutralizing agent such as either an inorganic base, such as sodium hydroxide or an organic amine, such as a lower alkylamine, or a lower alkanolamine as for instance, diethylamine, triethylamine, or diisopropanolamine is added to effect solubilization of the polymer, in amounts ranging from 1% to 10% by weight of the polymer.

It has been found that a satisfactory electrocoating bath can be prepared from the aforementioned mixture by blending the same with deionized water to effect its emulsification. It is good practice to next age the emulsified blend for a period of 24 hours. The solids content of the bath is maintained at from 1% to 20%, and preferably from 5% to 15%, based on the overall weight of the emulsion. The preferred concentration of the tris-(alkylsulfonyl) methane in the bath is between 0.1% and 0.5%.

Although formulations of the above components find utility in the areas of conventional organic coatings, adhesives and thermoset resins, it finds particular utility in electrodeposition techniques, since the properties of electrocoated surfaces are markedly enhanced, as for instance, resistance to corrosion and solvent exposure.

Electrodeposition is effected at room temperature in the conventional manner by utilizing a metallic substrate as an anode and any metallic surface as the cathode by applying a potential of from 25 volts to 500 volts, and preferably from 50 volts to 200 volts, across the electrodes. Generally, sixty seconds are sufficient to accomplish the electrocoating process.

The coated substrate is next water washed, usually with deionized water, and heat cured to effect cross-linking of the polymer of the present invention. Significantly, this can be accomplished at temperatures ranging from about 210°F. to not more than about 260°F., whereby distortion of the crystalline structure of the coated metal so heated does not occur. However, where distortion of the crystalline structure of the metal upon heating does not present a problem, higher cure temperatures say to about 350°F. or even higher may be employed, if desired. Further, the coated cured surface is impervious to all known organic solvents.

It is also within the scope of the present invention to incorporate various dyes and pigment additives to impart color to the novel polymeric compositions. For instance, compatible dyes or pigments, such as $TiO_2$, $Fe_2O_3$, metal chromates (i.e., lead chromate or strontium chromate) or carbon black can be used so that the resultant electrocoated metal substrate is white, red, yellow, black, or any desired color. Usually, the amount of pigment incorporated therein ranges from about 0.1% to about 6% of the overall coating bath.

The following examples are set forth primarily for purposes of illustration and any specific enumeration of detail contained therein should not be interpreted as a limitation except as is indicated in the appended claims. All parts and percentages are by weight unless otherwise indicated.

EXAMPLE 1

A polymer derived from 39% butyl acrylate, 11% 2-hydroxyethyl acrylate, 11% acrylic acid and 39% styrene is prepared in ethyl amyl ketone, utilizing azobisisobutyronitrile as the catalyst employing a temperature of about 85°C. The polymer analyzes as having an acid number of 85, a hydroxyl number of 55, and a viscosity of 150 poises.

Seventy-seven parts of a 70% hereinabove prepared polymer solution (in ethyl amyl ketone-ethylene glycol monoethyl ether) are blended to form a paste with a mixture of 22.0 parts of tetra (ethoxymethyl) di (methoxymethyl) melamine cross-linking agent, 3 parts of diethylamine and 23.0 parts of titanium pigment to prepare a paste. Resultant paste is next emulsified in 860 parts of deionized water. To this emulsion are added 2.0 parts of 2,6,7-trithiabicyclo[2.2.2]octane-2,2,6,6,7,7-hexaoxide dissolved in one part of diethylamine and 25 parts of a 1:1 mixture of water/2-ethoxyethanol. The emulsion, aged for 24 hours, is placed in an electrocoating bath.

There is inserted into the latter bath a stainless steel plate which is used as a cathode and a zinc-phosphated cold-roller steel panel which is used as the anode. A potential of from about 100 volts to about 300 volts is applied for from 1 to 3 minutes. The anode is next removed, washed with deionized water and the excess water blown off. The coated panel is next baked at about 250°F.–260°F. for 20 minutes.

The coated panel of 0.6 mil thickness is resistant to organic solvents such as acetone, methyl ethyl ketone, and possess a Knoop hardness of 9.25.

Similar results are obtained where either 4-methyl-2,6,7-trithiabicyclo[2.2.2]octane-2,2,6,6,7,7 hexaoxide or the 4-ethyl homolog of the latter is substituted for 2,6,7-trithiabicyclo[2.2.2]octane-2,2,6,6,7,7 hexaoxide in the electrocoating bath.

EXAMPLE 2

The procedure of Example 1 above is repeated except that the 2,6,7-trithiabicyclo[2.2.2]octane-2,2,6,6,7,7-hexaoxide adjuvant is omitted from the electrocoating bath. A coating is deposited at the same film thickness onto the same uncoated panel, washed and cured at about 250°F. to 260°F. for 20 minutes. The panel is found to be soft, of Knoop hardness equal to 1.5 and exhibited no resistance to organic solvents. Acetone, for instance, dissolved the coating.

EXAMPLE 3

81 parts of a 70% polymer solution in ethyl amyl ketone-ethylene glycol monoethyl ether as defined in Example 1 above are blended with 23 parts of tetra(methoxymethyl) benzoguanamine-salicylic acid as a cross-linking reagent. To this blend are next added 3.6 parts of diethylamine and 23.0 parts of titanium dioxide to form a paste. Resultant paste is emulsified in 860 parts of deionized water. To the latter emulsion are added 2.0 parts of 4-isopropyl-2,6,7-trithiabicyclo[2.2.2]octane-2,2,6,6,7,7-hexaoxide, in the form of an aqueous diethylamine solution.

An electrocoating bath is prepared as in Example 1 above and electrodeposition is accomplished at 300 volts per minute. The coated panel is rinsed with deionized water and baked at 250°F. for 20 minutes. A film having a 0.8 mil thickness is obtained.

The film is totally resistant to organic solvents including "Skydrol 500 A" and exhibited a Knoop hardness of 14.2.

Repeating the procedure of the above and utilizing 4-n-butyl-2,6,7-trithiabicyclo[2.2.2]octane-2,2,6,6,7,7-hexaoxide in lieu of the corresponding 4-isopropyl homolog of the latter, similar results in the coating are noted.

EXAMPLE 4

The procedure of Example 3 above is repeated in every detail except that the 2,6,7-trithiabicyclo[2.2.2]octane-2,2,6,6,7,7-hexaoxide additive was omitted, the electrodeposited cured film is found to be both soft and sticky.

EXAMPLE 5

The procedure of Example 3 is repeated in every detail except that the cross-linking agent, tetra(methoxymethyl) benzoguanamine-salicylic acid reaction product, is replaced with 18.5 parts of tetra(methoxymethyl) benzoguanamine) and the potential applied is 200 volts rather than 300 volts.

Curing of the deposited film occurred at about 300°F. for 20 minutes at which time a film thickness of 0.8 mil is measured. The film is totally resistant to the organic solvents of Examples 1 and 3 above.

EXAMPLE 6

100 parts of a 50% solution of the polymer prepared in Example 1 above are blended with 20 parts of hexakis (methoxy methyl) melamino.

Draw down films which were prepared from this blend were cured at 300°F. for 20 minutes and found to be soft and sticky, indicating no resistance to solvent attack.

EXAMPLE 7

The procedure of Example 6 is repeated in every respect except that 0.2 part of 2,6,7-trithiabicyclo[2.2.2]octane-2,2,6,6,7,7-hexaoxide dissolved in 5 parts of 2-ethoxyethanol, is added to the polymer-curing agent coating composition.

Draw down films which were prepared from this modified blend were cured at 250°F. for 20 minutes and found to be resistant to acetone and methyl ethyl ketone.

EXAMPLE 8

Into a suitable reaction vessel equipped there is introduced for purposes of preparing a polyester 150 parts of tall oil fatty acids and the acid number of the charge is determined. There is then added 36.5 parts of 4-oxatricyclo (6.2.1 $O^{2,7}$ $O^{3,5}$)-undecan-9-(10)ol. The materials are mixed together and the acid number of the blend is determined. The acid number of the blend should be about 80.5, 0.5% of the acid number as originally determined. The charge is then heated under an inert blanket of nitrogen gas or carbon dioxide to a temperature of 230-235°C. using an open stack. The charge is held for 5 hours at that temperature. Subsequent to the five hour period, the acid number is determined every hour and when the acid number drops to below about 10, the mass is cooled to about 200°C. and the viscosity reading is taken on a sample on the Gardner-Holdt scale at 25°C. The inert gas flow is reduced and it is switched to an inert blanket. There is then added 22 parts of maleic anhydride, while the mass is held at around 200°C to 210°C. The mass with constant stirring is heated over a period of time from 15 to 30 minutes to a temperature of 230-235°C. When the charge reaches 230°C-235°C., it is held at that temperature for about 90 minutes. Thereupon the mass is cooled to about 145°C.-150°C. and viscosity determinations are taken on samples again under the Gardner-Holdt scale at 25°C. A reflux condenser is then attached to the reaction system followed by the addition of 22 parts of diacetone alcohol, an inert organic solvent and the mass is then refluxed at about 145°-150°C. The batch is maintained at 145°C.-150°C. There is prepared separately a blend of 77 parts of monomeric styrene, 8.8 parts of acrylic acid, 1.75 parts ditertiarybutylperoxide and 0.44 part of n-dodecylmercaptan. The blend of these components is then fed into the reaction system over a period of about 100-120 minutes. The reflux is maintained throughout the whole reaction. The temperature drops slightly during the addition of the blend to about 135°C.-140°C. After the addition is finished, the batch is then held at about 135°C.-140°C. for about 2 hours. Subsequent to the holding period, the batch is cooled to about 110°C. and there is added 75 parts of secondary butanol, an inert organic solvent. The final product had a Brookfield viscosity at 25°C. of 50-150 poises and on the Gardner-Holdt scale at 25°C., the viscosity was $Z_3$-$Z_6$; color on the Gardner scale is <8 and had an acid number of 80.

EXAMPLE 9

This example illustrates the preparation of an electrocoating bath utilizing the polyester resin prepared in accordance with Example 8 above.

Into a suitable reaction vessel used for mixing purposes there is introduced 70 parts of the resin composition prepared according to Example 8, above. Additionally, there is added the following components: 16.5 parts of a fully etherified melamine aldehyde cross-linking agent, 2.8 parts of diethylamine, 33 parts of rutile titanium dioxide and 860 parts deionized water in the order set forth hereinafter. The cross-linking agent, namely, the tetraethyl dimethyl ethers of hexa methylol melamine, and the diethylamine are added to the resin initially, followed by the addition of the titanium dioxide. The mixture is next ground into a paste on a three-roll mill. Under high speed agitation the deionized water is added in small portions to the paste. When phase inversion takes place, the rest of the deionized water can be added in one portion. This bath is agitated for 24 hours prior to use. The 10% solids paint is poured into a steel container acting as a cathode. The metal piece to be coated, acting as an anode is inserted into the bath. A potential of 200 volts across the electrodes is employed for one minute. The film deposited on the metal piece is rinsed with deionized water and baked for 20 minutes at 300°F. The coating is found to be soft and soluble in acetone.

EXAMPLE 10

Repeating Example 9 in every detail except that 0.4 part of 2,6,7-trithiabicyclo[2.2.2]octane-2,2,6,6,7,7-hexaoxide (dissolved in 10 parts of water and 0.5 parts of diethylamine) is added to the electrocoating bath. A hard and solvent resistant coating is obtained. Acetone, for instance, did not affect the resultant coating.

We claim:

1. In a process for depositing a film on a metal substrate, the improvement which comprises: coating said metal substrate with a water dispersed composition comprising (A) from about 40% to about 95%, by weight, of an anionic acrylic resin, said resin containing from about 1.0% to about 25% carboxyl groups or from about 0.5% to about 10% alcoholic hydroxyl groups or mixtures of the same, (B) from about 4.9% to about 50%, by weight, of a fully etherified amino aldehyde cross-linking agent, and (C) from about 0.1% to about 10%, by weight, of a cyclic trisulfone having the structure:

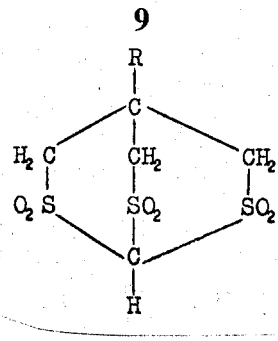

wherein R is an alkyl radical of from 1 to 4 carbon atoms, said percentage of (C) being based on the overall solids content of said (A) and (B), depositing a film ranging from about 0.6 to about 1 mil in thickness, heat treating the so-coated metal substrate at a temperature from 210°F. and 350°F., and recovering a hard-coated substrate, impervious to organic solvents.

2. A process according to claim 1 wherein the coating is accomplished by a dipping technique.

3. A process according to claim 1 wherein the coating is accomplished by an electrodeposition technique.

4. A process according to claim 3 wherein the heat treatment temperature ranges from 210°F. to 260°F.

5. A process according to claim 1 wherein the metal substrate is zinc phosphated cold-rolled steel.

6. The process according to claim 1 wherein the cyclic trisulfone is 2,6,7-trithiabicyclo[2.2.2]octane-2,2,6,6,7,7-hexaoxide.

7. The process according to claim 1 wherein the cyclic trisulfone is 4-methyl-2,6,7-trithiabicyclo[2.2.2]octane-2,2,6,6,7,7-hexaoxide.

8. The process according to claim 1 wherein the carboxyl group is derived from acrylic acid.

9. The process according to claim 1 wherein the cross-linking agent is tetra(ethoxymethyl)-di(methoxymethyl) melamine.

* * * * *

UNITED STATES PATENT OFFICE
CERTIFICATE OF CORRECTION

Patent No. 3,850,735               Dated November 26, 1974

Inventor(s) Girish Girdhar Parekh et al.

It is certified that error appears in the above-identified patent and that said Letters Patent are hereby corrected as shown below:

Column 2 line 29.  Change "will" to -- may --.
Column 7 line 13.  Change "melamino" to -- melamine --.
Column 9 line 18.  Change "210°F. and 350°f." to -- 210°F. to 350°F. --.

Signed and sealed this 4th day of March 1975.

(SEAL)
Attest:

RUTH C. MASON
Attesting Officer

C. MARSHALL DANN
Commissioner of Patents
and Trademarks